(12) United States Patent
Lee et al.

(10) Patent No.: US 11,073,383 B2
(45) Date of Patent: Jul. 27, 2021

(54) GEOMETRIC ERROR MEASUREMENT METHOD FOR FEED DRIVE SYSTEM AND COMPUTER-READABLE RECORDING MEDIUM HAVING PROGRAM RECORDED FOR EXECUTING SAME

(71) Applicants: Kyungil University Industry-Academic Cooperation Foundation, Gyeongbuk (KR); Kyungpook National University Industry-Academic Cooperation Foundation, Daegu (KR)

(72) Inventors: Kwang Il Lee, Daegu (KR); Seung Han Yang, Daegu (KR); Hoon Hee Lee, Gyeongsan-si (KR)

(73) Assignees: Kyungil University Industry-Academic Cooperation Foundation, Gyeongsan-si (KR); Kyungpook National University Industry-Academic Cooperation Foundation, Daegu (KR)

( * ) Notice: Subject to any disclaimer, the term of this patent is extended or adjusted under 35 U.S.C. 154(b) by 441 days.

(21) Appl. No.: 16/037,479

(22) Filed: Jul. 17, 2018

(65) Prior Publication Data
US 2019/0025051 A1 Jan. 24, 2019

(30) Foreign Application Priority Data
Jul. 19, 2017 (KR) .................. 10-2017-0091344

(51) Int. Cl.
G01B 21/04 (2006.01)
G05B 19/401 (2006.01)
G01B 3/30 (2006.01)

(52) U.S. Cl.
CPC ............ *G01B 21/045* (2013.01); *G01B 3/30* (2013.01); *G01B 21/042* (2013.01); *G05B 19/401* (2013.01)

(58) Field of Classification Search
CPC ...... G01B 21/042; G01B 21/045; G01B 3/30; G05B 19/401
See application file for complete search history.

(56) References Cited

U.S. PATENT DOCUMENTS 6,269,284 B1* 7/2001 Lau .................... G05B 19/404 700/193
2005/0234671 A1* 10/2005 Morfino ............. G05B 19/4015 702/95

(Continued)

FOREIGN PATENT DOCUMENTS

KR 10-1593330 B1 2/2016

*Primary Examiner* — Manuel A Rivera Vargas
*Assistant Examiner* — Yaritza H Perez Bermudez
(74) *Attorney, Agent, or Firm* — Rabin & Berdo, P.C.

(57) ABSTRACT

A geometrical error measurement method for a feed drive system includes entering coordinate values of four vertices of a virtual regular tetrahedron, mounting a position indicator to an end of a main shaft of a feed drive system, mounting three center mounts at three respective vertices of the four vertices except for the remaining vertex at which the main shaft is positioned while moving the main shaft of the feed drive system sequentially from one vertex to another according to the entered coordinate values, measuring distances between each of the four vertices indicated by the three center mounts and the position indicator with a double ballbar, and calculating a geometrical error from the measured distances.

10 Claims, 5 Drawing Sheets

(56) References Cited

U.S. PATENT DOCUMENTS

| | | | |
|---|---|---|---|
| 2011/0022220 A1* | 1/2011 | Smith | G05B 19/401 |
| | | | 700/186 |
| 2011/0218780 A1* | 9/2011 | Yang | G06F 17/10 |
| | | | 703/2 |

* cited by examiner

GEOMETRIC ERROR MEASUREMENT METHOD FOR FEED DRIVE SYSTEM AND COMPUTER-READABLE RECORDING MEDIUM HAVING PROGRAM RECORDED FOR EXECUTING SAME

CROSS REFERENCE TO RELATED APPLICATION

The present application claims priority to Korean Patent Application No. 10-2017-0091344, filed Jul. 19, 2017, the entire contents of which is incorporated herein for all purposes by this reference.

BACKGROUND OF THE INVENTION

Field of the Invention

The present invention relates to a geometric error measurement method for a feed drive system and a computer-readable recording medium having a program recorded therein for executing the same. More particularly, the present invention relates to a geometric error measurement method for a feed drive system, the method forming a virtual regular tetrahedron, sequentially moving a main shaft of the feed drive system to each of four vertices of the formed regular tetrahedron, measuring distances between each of the four vertices with a double ballbar, and calculating a geometric error in the feed transfer system. The present invention also relates to a computer-readable recording medium having a program recorded therein for executing the method.

Description of the Related Art

Generally, a high-precision feed drive system refers to a mechanical device having two or more feed axes. Examples of the high-precision feed drive system include a multi-axis machine tool, a multi-axis robot (also called an articulated robot), and a coordinate-measuring machine (CMM). Such a feed drive system usually includes one or more linear axes and one or more rotation axes. A representative example thereof is a 5-axis machine tool. In general, a 5-axis machine tool includes three linear axes and two rotation axes to machine complex curves or shapes.

However, due to machining errors and assembly errors of parts, such a high-precision precise feed transfer system inevitably involves geometrical errors along a feed axis. Therefore, in production sites, the geometrical errors in the feed-axis direction are periodically measured for calibration so that products can be produced with high precision.

FIG. 1 is a perspective view of a typical three-axis machine tool. A three-axis machine tool has three feed axes. Geometrical errors will be described with reference to a 3-axis machine tool as an example.

FIG. 2 is a diagram for describing an error along a feed axis, and FIG. 3 is a diagram for describing a squareness error between two feed axes.

A description of the errors will be given with reference to FIGS. 2 and 3.

R represents a standard coordinate system, X represents a coordinate system fixed to a designed x-directional feed axis, and X' represents a coordinate system fixed to an actual x-directional feed axis.

Geometric errors in a feed drive system include an axial error, which is an error along a feed axis, and a squareness error between two feed axes. The axial error means an error between a design position and an actual position in the direction of a feed axis. FIG. 2 shows the axial error in the x-axis direction. The axial error includes three positional errors and three angular errors.

On the other hand, the squareness error is an error in the angle between the feed axes. For a 3-axis machine tool, there are 3 sources of squareness error between the feed axes.

Therefore, for a 3-axis machine tool, there are a total of 21 sources of geometrical error, comprising three sources of squareness error and 18 sources of axial error.

In a conventional product-processing field, 21 error sources (geometric error sources) of a feed drive system are measured with a laser interferometer, and the feed drive system is reassembled to eliminate the error. Therefore, the conventional error measurement method has been identified as a factor that lowers processing productivity in the product-processing field because it takes a long time. For this reason, it has been impossible in practice to calibrate all of the feed drive systems existing in the processing field.

Furthermore, since measurement equipment such as a laser interferometer is very expensive, it has been difficult to equip a processing field having multiple feed drive systems with a sufficient quantity of measurement equipment.

Therefore, it is required to develop a more practical measurement method that can quickly measure the principal geometrical errors in a feed drive system using inexpensive measurement instruments given the actual circumstances of the corresponding processing field. If such a practical measurement method is developed, it will be widely used for periodic inspection, and it will be a useful tool for error determination of an apparatus for which precise calibration is required.

DOCUMENTS OF RELATED ART

Patent Document (Patent Document 0001) Korean Patent No. 10-1593330

SUMMARY OF THE INVENTION

An objective of the present invention is to provide a geometrical error measurement method for a feed drive system, the method being capable of measuring principal geometric errors in the feed drive system using only a double ballbar.

Another objective of the present invention is to provide a geometrical error measurement method for a feed drive system, the method being capable of providing consistent measurement results using a standard virtual regular tetrahedron.

A further objective of the present invention is to provide a geometrical error measurement method for a feed drive system, the method being flexibly applicable to feed drive systems of various sizes by adopting a technique of easily changing the size of a standard virtual regular tetrahedron and the length of a double ballbar.

In order to accomplish the objectives of the present invention, there is provided a geometrical error measurement method for a feed drive system, the method including: entering coordinate values of each of four vertices of a virtual regular tetrahedron into a feed drive system; mounting a position indicator to an end of a main shaft of the feed drive system; mounting first to third center mounts respectively at three of four vertices formed based on the entered coordinate values, other than a fourth vertex, at which the main shaft is positioned while moving the main shaft of the feed drive system to each of the four vertices that are formed based on the entered coordinate values; measuring distances between each of the four vertices indicated by the three center mounts and the position indicator mounted to the end of the main shaft with a double ballbar; and calculating a geometrical error in the feed drive system, based on the measured distances between each of the four vertices.

The geometrical error may include a scale error, defining a distance error in a feed-axis direction, and a squareness error, defining an angular error between feed axes.

The calculating the geometrical error may include: calculating actual coordinates, from the measured distances between each of the four vertices; obtaining coordinate differences, each coordinate difference being a difference between each of the entered coordinates of the four vertices of the virtual regular tetrahedron and a corresponding one of the calculated actual coordinates and defining a relationship between the geometrical error and the coordinate difference; and calculating the geometrical error by applying a least-squares method.

The relationship between the geometrical error and the coordinate difference between the coordinates of each vertex of the virtual regular tetrahedron and the measured coordinates of each vertex of the measured regular tetrahedron is defined by Expression 1 described below.

$$\begin{bmatrix} x_{1,m} - x_1 \\ y_{1,m} - y_1 \\ z_{1,m} - z_1 \\ \vdots \\ x_{4,m} - x_4 \\ y_{4,m} - y_4 \\ z_{4,m} - z_4 \end{bmatrix} = \begin{bmatrix} -x_1 & 0 & 0 & y_1 & 0 & z_1 \\ 0 & -y_1 & 0 & 0 & -z_1 & 0 \\ 0 & 0 & z_1 & 0 & 0 & 0 \\ \vdots & \vdots & \vdots & \vdots & \vdots & \vdots \\ -x_4 & 0 & 0 & y_4 & 0 & z_4 \\ 0 & -y_4 & 0 & 0 & -z_4 & 0 \\ 0 & 0 & z_4 & 0 & 0 & 0 \end{bmatrix} \begin{bmatrix} c_x \\ c_y \\ c_z \\ s_{zx} \\ s_{xz} \\ s_{yz} \end{bmatrix} \quad \text{[Expression 1]}$$

where, $c_i$: feed axis error (i=X, Y, Z),
$s_{ij}$: feed axis error (i, j→=X, Y, Z),
$x_i$: x coordinate of a vertex of a virtual regular tetrahedron (i=1, 2, 3, 4),
$y_i$: y coordinate of a vertex of the virtual regular tetrahedron (i=1, 2, 3, 4),
$z_i$: z coordinate of a vertex of the virtual regular tetrahedron (i=1, 2, 3, 4),
$x_{i,m}$: x coordinate of a vertex of a measured regular tetrahedron (i=1, 2, 3, 4),
$y_{i,m}$: y coordinate of a vertex of the measured regular tetrahedron (i=1, 2, 3, 4), and
$z_{i,m}$: z coordinate of a vertex of the measured regular tetrahedron (i=1, 2, 3, 4).

Further, the position indicator is a tool ball or a three-point support socket.

The present invention also provides a computer-readable recording medium in which a program for executing the method is stored.

The geometrical error measurement method for a feed drive system according to the present invention has an effect of measuring principal geometrical errors in the feed drive system using only a double ballbar, which is relatively inexpensive compared with a conventional error measurement device such as a laser interferometer.

In addition, the geometrical error measurement method according to the present invention has an effect of providing consistent measurement results over iterative measurements due to the use of a virtual standard regular tetrahedron.

In addition, the geometrical error measurement method according to the present invention has an effect of being flexibly applicable to various sizes of feed drive systems.

In addition, the geometrical error measurement method according to the present invention has an effect of being applicable to a three-dimensional coordinate-measuring machine without any additional tools.

The above and other objects, features and advantages of the present invention will be more apparent from the following detailed description taken in conjunction with the accompanying drawings.

DETAILED DESCRIPTION OF THE INVENTION

Figure 1:
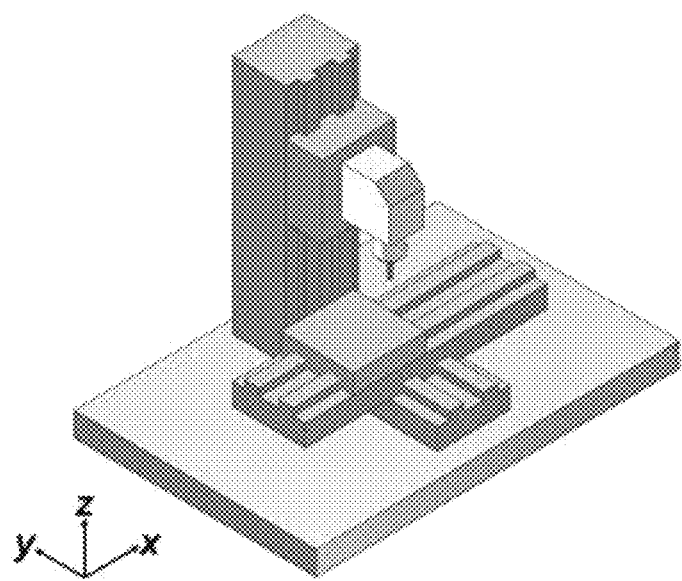
FIG. 1 is a perspective view of a typical three-axis machine tool.
Figure 2:
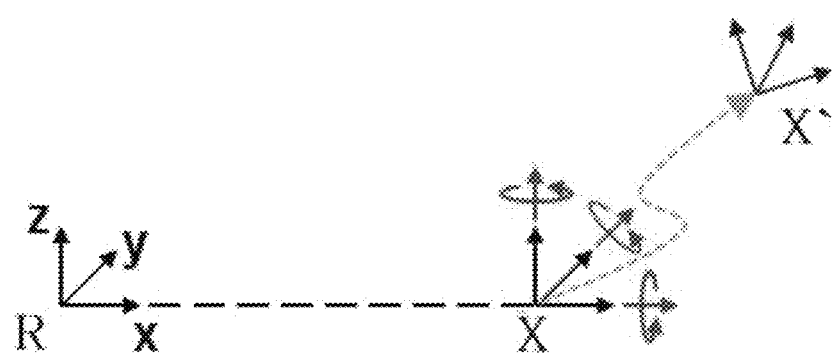
FIG. 2 is a view for describing an axial error.
Figure 3:
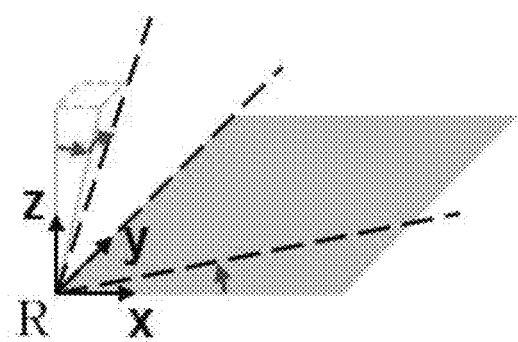
FIG. 3 is a view for describing a squareness error between feed axes.

Hereinafter, various embodiments of the present disclosure will be described with reference to the accompanying drawings. It should be understood, however, that the techniques described herein are not intended to be limited to any particular embodiment, but are rather intended to cover various modifications, equivalents, and/or alternatives of the embodiments. Throughout the drawings, like elements may be denoted by like reference numerals.

Terms used in the specification, such as "first", "second", etc., can be used to distinguish one component from another component, but the order or priority of the components are not limited unless specifically stated. Accordingly, a first component in an embodiment may be referred to as a second component in another element, and similarly, a second component in an embodiment may be referred to as a first component in another embodiment within the scope of the present disclosure.

The terminology used herein is for the purpose of describing particular embodiments only and is not intended to limit the invention. As used herein, the singular forms "a", "an" and "the" are intended to include the plural forms as well, unless the context clearly indicates otherwise. In addition, unless otherwise defined, all terms including technical and scientific terms used herein have the same meaning as commonly understood by those who are ordinarily skilled in the art to which this invention belongs. It will be further understood that terms, such as those defined in commonly used dictionaries, should be interpreted as having meanings that are consistent with their meanings in the context of the relevant art and the present disclosure, and are not to be interpreted in an idealized or overly formal sense unless expressly so defined herein. In some cases, the terms defined in the present disclosure should not be construed to exclude embodiments of the present disclosure.

Figure 4A:
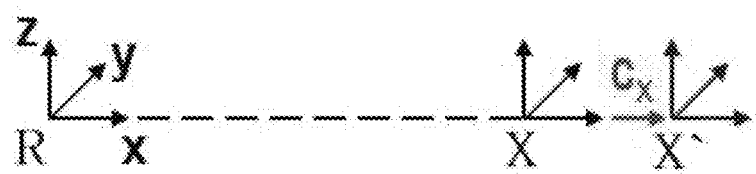
FIGS. 4A and 4B are views for describing principal geometrical errors.
Figure 4B:
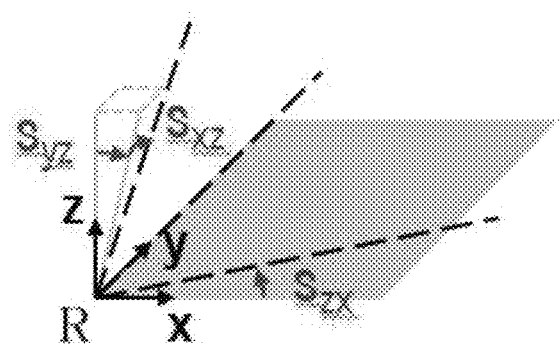

FIGS. 4A and 4B are views for describing principal geometrical errors. In FIGS. 4A and 4B, a scale error is denoted by (a), and a squareness error is denoted by (b).

The scale error ($c_i$, i=X, Y, or Z) means a distance error in the direction of a feed axis. That is, $C_x$ means an x-axis-direction scale error. The error between feed axes, i.e., the squareness error ($s_{ij}$, i, j=X, Y, or Z), means an angular error between two feed axes. That is, $s_{yz}$ means an angular error between a y axis and a z axis.

The scale errors and the squareness errors are recognized as geometric errors that have a significant effect on the performance of a feed drive system.

Therefore, conventionally, a touch probe is attached to a machine tool or a three-dimensional coordinate-measuring machine (CMM), and scale errors and squareness errors are calculated by measuring the vertices of a standard regular tetrahedron.

However, since the touch probe and the standard regular tetrahedron are very expensive, it has been difficult to equip all feed drive systems with a touch probe and a standard regular tetrahedron.

Figure 5:
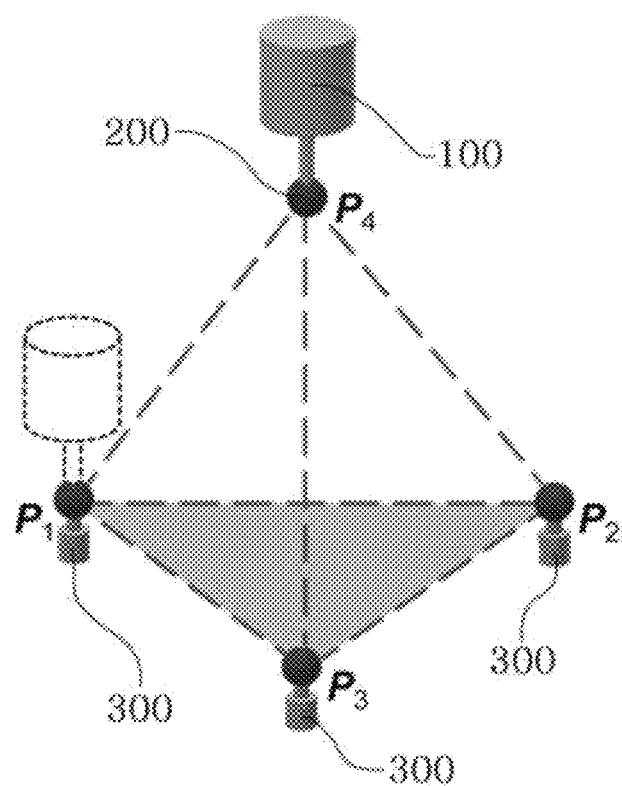
FIG. 5 is a view for describing a method of sequentially moving the main axis of a feed drive system to the vertex positions of a regular tetrahedron, according to the present invention.
Figure 6A:
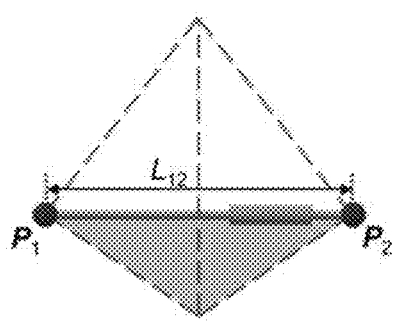
FIGS. 6A to 6F are views for describing a method of measuring a distance between vertices of a regular tetrahedron with a double ballbar, according to the present invention.
Figure 6B:
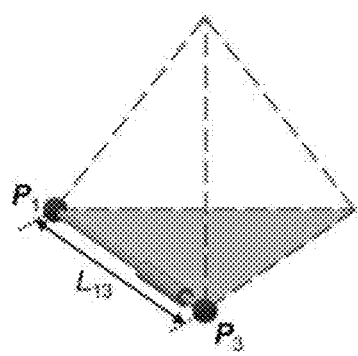
Figure 6C:
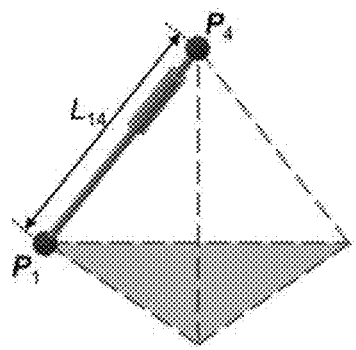
Figure 6D:
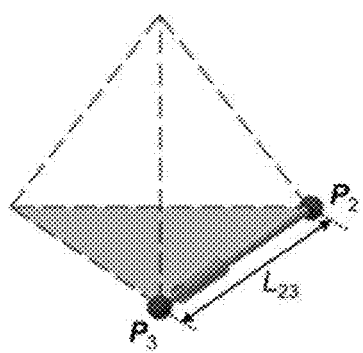
Figure 6E:
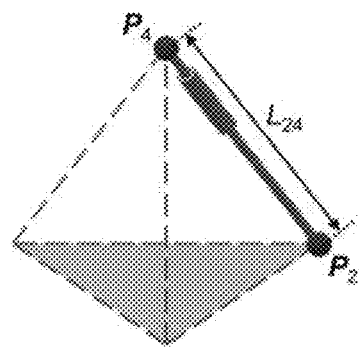
Figure 6F:
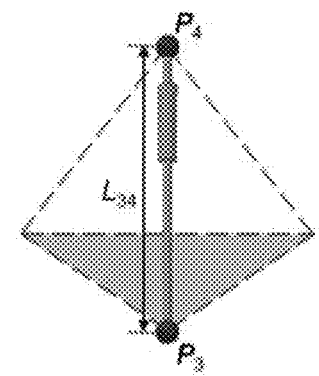

FIG. 5 is a view for describing a method of sequentially moving a main shaft 100 of a feed member to each of the vertex positions of a regular tetrahedron, according to the present invention.

FIGS. 6A to 6F are views illustrating a method of measuring the distance between the vertices of a regular tetrahedron with a double ballbar according to the present invention.

A geometrical error measurement method for a feed drive system, according to one embodiment of the present invention, will be described with reference to FIGS. 5 and 6.

Before describing the geometrical error measurement method according to the present invention, a double ballbar will first be briefly described.

A double ballbar is a length-variable structure configured such that one pipe is inserted into another pipe in such a way that the pipes overlap each other so that the total length of the two pipes can be adjusted. Balls or three-point support sockets are mounted at both ends of the double ballbar so that the length of the double ballbar can be adjusted.

Inside the double ballbar is provided a sensor such as a linear variable differential transformer (LVDT) to measure the distance between the balls mounted at both ends of the double ballbar.

Hereinafter, the geometrical error measurement method according to the present invention will be described below.

According to the present invention, a virtual regular tetrahedron is used instead of a standard regular tetrahedron.

A virtual regular tetrahedron of an appropriate size is formed in consideration of the processing volume of a feed drive system to be measured and calibrated.

In the case of using a conventional standard regular tetrahedron, since the size is fixed, the standard regular tetrahedron cannot be used for various feed drive systems having different sizes. However, with the use of a virtual regular tetrahedron, this problem can be solved because the size of the virtual regular tetrahedron can be freely changed.

In addition, the conventional standard regular tetrahedron does not provide consistent measurement results over time because it gradually wears out through repeated use.

However, the use of a virtual regular tetrahedron can provide consistent measurement results over time even after repeated use.

Next, the coordinates of the four vertices constituting the virtual regular tetrahedron are entered into the feed drive system, which is the measurement target to be measured and calibrated.

A position indicator 200 is mounted at the lower end of the main shaft 100 of the feed drive system in order to indicate the position of the top vertex. In this case, typically, a tool ball or a three-point support socket is used as the position indicator 200.

The tool ball or the three-point support socket are coupled to the main shaft 100 by a magnetic force or by being bolted. FIG. 5 illustrates the case where a tool ball is mounted at the lower end of the main shaft 100.

The main shaft 100 equipped with the tool ball is sequentially moved to positions corresponding to the four vertices of a virtual regular tetrahedron formed according to the entered coordinates, from one position to another, and center mounts 300 are installed at respective vertices except for the top vertex, at which the main shaft 100 is positioned, in order to indicate the positions of the vertices other than the top vertex. That is, the center mounts 300 indicate the positions of the corresponding vertices according to entered coordinates.

In FIGS. 5 and 6, P1 to P4 represent the positions of the respective vertices of a regular tetrahedron.

The center mounts 300 are mounted at first to third vertices except for a fourth vertex (top vertex) at which the main shaft 100 is positioned.

That is, the three center mounts 3000 and the tool ball mounted at the end of the main shaft 100 indicate the positions of the four vertices of the regular tetrahedron which is formed based on the entered coordinates.

With the use of a double ballbar, the distances between each of the three center mounts 300 and the distances between the tool ball mounted at the end of the main shaft 100 and each of the three center mounts 300 are measured. Thus, a total of six distances are measured. In FIGS. 6A to 6F, $L_{ij}$ represents each of the measured distances between each of the vertices, where i and j each range from 1 to 4.

The geometric errors of the feed drive system are calculated from the measured distances between each of the vertices. Here, the geometric errors include scale errors and squareness errors.

Next, the process of calculating the geometric errors from the measured distances between each of the vertices of the regular tetrahedron will be described.

First, the actual coordinates of the four vertices of the regular tetrahedron are calculated from the measured distances between each of the vertices of the regular tetrahedron.

Then, the difference between each of the actual coordinates of the vertices calculated from the measured distances and a corresponding one of the entered coordinates of the virtual regular tetrahedron is calculated.

Then, the relationship between the coordinate difference and the geometric error is defined.

Expression 1 below defines the relationship of the geometrical error and the coordinate differences between the coordinates of the vertices of the virtual regular tetrahedron and the measured coordinates of the vertices of the regular tetrahedron.

$$\begin{bmatrix} x_{1,m} - x_1 \\ y_{1,m} - y_1 \\ z_{1,m} - z_1 \\ \vdots \\ x_{4,m} - x_4 \\ y_{4,m} - y_4 \\ z_{4,m} - z_4 \end{bmatrix} = \begin{bmatrix} -x_1 & 0 & 0 & y_1 & 0 & z_1 \\ 0 & -y_1 & 0 & 0 & -z_1 & 0 \\ 0 & 0 & z_1 & 0 & 0 & 0 \\ \vdots & \vdots & \vdots & \vdots & \vdots & \vdots \\ -x_4 & 0 & 0 & y_4 & 0 & z_4 \\ 0 & -y_4 & 0 & 0 & -z_4 & 0 \\ 0 & 0 & z_4 & 0 & 0 & 0 \end{bmatrix} \begin{bmatrix} c_z \\ c_y \\ c_z \\ s_{zx} \\ s_{xz} \\ s_{yz} \end{bmatrix} \quad \text{[Expression 1]}$$

Here, $c_i$: scale error (i=X, Y, Z),
$s_{ij}$: squareness error (i, j→=X, Y, Z),
$x_i$: the x coordinate of a vertex of a virtual regular tetrahedron (i=1, 2, 3, 4),
$y_i$: the y coordinate of a vertex of the virtual regular tetrahedron (i=1, 2, 3, 4),
$z_i$: the z coordinate of a vertex of the virtual regular tetrahedron (i=1, 2, 3, 4),
$x_{i,m}$: the x coordinate of a vertex of a measured regular tetrahedron (i=1, 2, 3, 4),
$y_{i,m}$: the y coordinate of a vertex of the measured regular tetrahedron (i=1, 2, 3, 4), and
$z_{i,m}$: the z coordinate of a vertex of the measured regular tetrahedron (i=1, 2, 3, 4).

Finally, the geometric errors can be obtained by applying the least-squares method to Expression 1.

Figure 7:
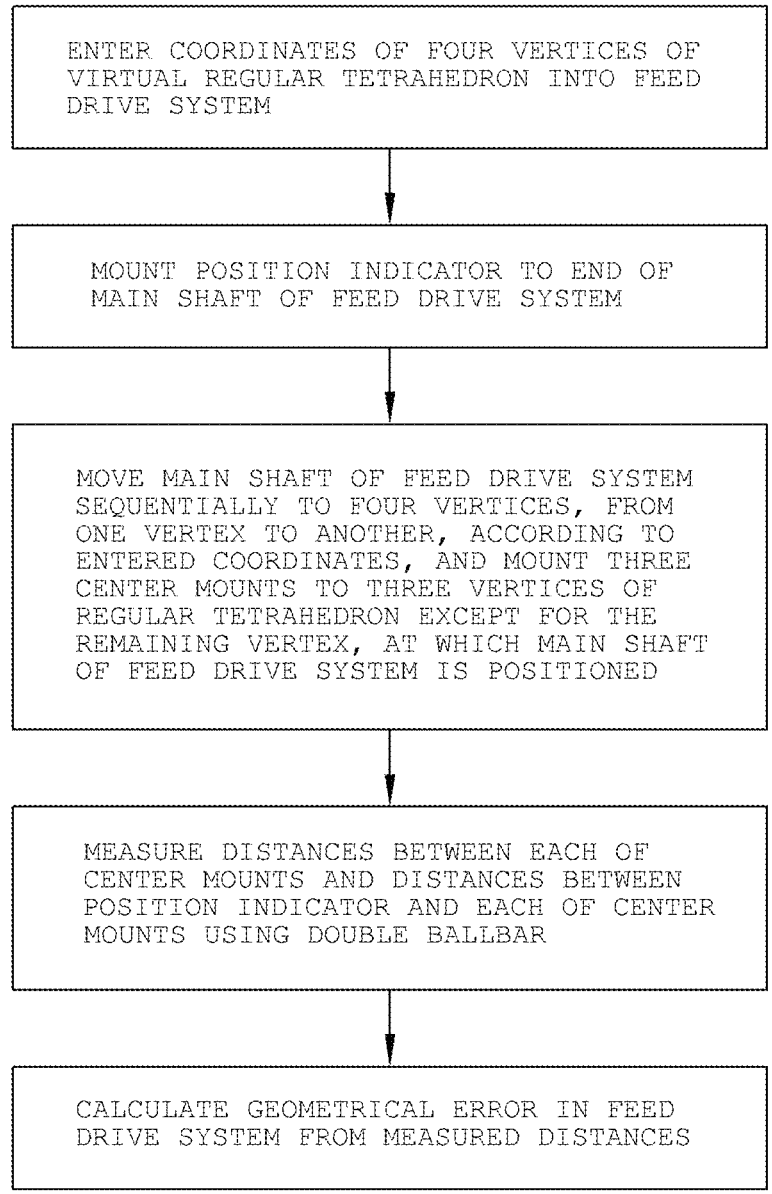
FIG. 7 is a flowchart illustrating a geometrical error measurement method for a feed drive system, according to the present invention.

FIG. 7 is a flowchart illustrating a geometric error measurement method for a feed drive system according to the present invention.

According to the present invention, the geometrical error measurement method for a transfer system includes the steps of: entering the coordinate values of four vertices of a virtual regular tetrahedron into a feed drive system; mounting a position indicator 200 at an end of a main shaft 100 of the feed drive system; sequentially mounting three center mounts 300 one after another at three respective vertices in a plane except for the top vertex while moving the main shaft 100 of the feed drive system according to the entered coordinate values; measuring distances between each of the four vertices with a double ballbar; and calculating geometrical errors in the feed drive system based on the measured distances between each of the four vertices.

The geometrical error measurement method for a feed drive system according to the present invention can be programmed and stored as a program in a computer-readable recording medium. The recording medium having the program stored therein can be applied to various feed drive systems to measure geometrical errors in the feed drive systems.

Although the preferred embodiment of the present invention has been disclosed for illustrative purposes, those skilled in the art will appreciate that various modifications, additions, and substitutions are possible, without departing from the scope and spirit of the invention as disclosed in the accompanying drawings. It is thus well known to those skilled in the art that the present invention is not limited to the embodiment disclosed in the detailed description but rather covers various modifications, additions, substitutions, and equivalents.

What is claimed is:

1. A geometrical error measurement method performed by a feed drive system in response to execution by a computer processor of computer instructions stored in a non-transitory computer-readable recording medium, the method comprising:

entering coordinate values of four vertices of a virtual regular tetrahedron;
mounting a position indicator to an end of a main shaft of a feed drive system;
mounting three center mounts at three respective vertices of the four vertices except for a remaining vertex at which the main shaft is positioned while moving the main shaft of the feed drive system sequentially from one vertex to another according to the entered coordinate values;
measuring distances between each of the three center mounts and distances between the position indicator mounted at the end of the main shaft and each of the three center mounts using a double ballbar; and
calculating a geometrical error from the measured distances between each of the four vertices.

2. The method according to claim 1, wherein the geometrical error includes a scale error representing a distance error in a feed-axis direction and a squareness error representing an angular error between two feed axes.

3. The method according to claim 2, wherein the calculating the geometrical error comprises:

calculating coordinate values of four vertices of a measured regular tetrahedron from the measured distances;
defining a relationship between the geometrical error and a coordinate difference between each of the entered coordinate values of the respective vertices of the virtual regular tetrahedron and a corresponding one of the calculated coordinate values of respective vertices of the measured regular tetrahedron; and
calculating the geometrical error by applying a least-squares method.

4. The method according to claim 3, wherein the relationship between the geometrical error and the coordinate difference between each of the entered coordinate values of the respective vertices of the virtual regular tetrahedron and a corresponding one of the calculated coordinate values of the respective vertices of the measured regular tetrahedron is defined as Expression 1, $$\begin{bmatrix} x_{1,m} - x_1 \\ y_{1,m} - y_1 \\ z_{1,m} - z_1 \\ \vdots \\ x_{4,m} - x_4 \\ y_{4,m} - y_4 \\ z_{4,m} - z_4 \end{bmatrix} = \begin{bmatrix} -x_1 & 0 & 0 & y_1 & 0 & z_1 \\ 0 & -y_1 & 0 & 0 & -z_1 & 0 \\ 0 & 0 & z_1 & 0 & 0 & 0 \\ \vdots & \vdots & \vdots & \vdots & \vdots & \vdots \\ -x_4 & 0 & 0 & y_4 & 0 & z_4 \\ 0 & -y_4 & 0 & 0 & -z_4 & 0 \\ 0 & 0 & z_4 & 0 & 0 & 0 \end{bmatrix} \begin{bmatrix} c_z \\ c_y \\ c_z \\ s_{zx} \\ s_{xz} \\ s_{yz} \end{bmatrix} \quad \text{[Expression 1]}$$

where, $c_i$: scale error (i=X, Y, Z),
$s_{ij}$: squareness error (i, j→=X, Y, Z),
$x_i$: an x coordinate of a vertex of a virtual regular tetrahedron (i=1, 2, 3, 4),
$y_i$: a y coordinate of a vertex of the virtual regular tetrahedron (i=1, 2, 3, 4),
$z_i$: a z coordinate of a vertex of the virtual regular tetrahedron (i=1, 2, 3, 4),
$x_{i,m}$: an x coordinate of a vertex of a measured regular tetrahedron (i=1, 2, 3, 4),
$y_{i,m}$: a y coordinate of a vertex of the measured regular tetrahedron (i=1, 2, 3, 4), and
$z_{i,m}$: a z coordinate of a vertex of the measured regular tetrahedron (i=1, 2, 3, 4).

5. The method according to claim 1, wherein the position indicator is a tool ball or a three-point support socket.

6. A non-transitory computer-readable recording medium containing computer instructions stored therein for causing a feed drive system to perform a geometrical error measurement method in response to execution by a computer processor of the computer instructions, the method comprising:
   entering coordinate values of four vertices of a virtual regular tetrahedron;
   mounting a position indicator to an end of a main shaft of a feed drive system;
   mounting three center mounts at three respective vertices of the four vertices except for a remaining vertex at which the main shaft is positioned while moving the main shaft of the feed drive system sequentially from one vertex to another according to the entered coordinate values;
   measuring distances between each of the three center mounts and distances between the position indicator mounted at the end of the main shaft and each of the three center mounts using a double ballbar; and
   calculating a geometrical error from the measured distances between each of the four vertices.

7. The non-transitory computer-readable recording medium of claim 6, wherein the geometrical error includes a scale error representing a distance error in a feed-axis direction and a squareness error representing an angular error between two feed axes.

8. The non-transitory computer-readable recording medium of claim 7, wherein the calculating the geometrical error comprises:
   calculating coordinate values of four vertices of a measured regular tetrahedron from the measured distances;
   defining a relationship between the geometrical error and a coordinate difference between each of the entered coordinate values of the respective vertices of the virtual regular tetrahedron and a corresponding one of the calculated coordinate values of respective vertices of the measured regular tetrahedron; and
   calculating the geometrical error by applying a least-squares method.

9. The non-transitory computer-readable recording medium of claim 8, wherein the relationship between the geometrical error and the coordinate difference between each of the entered coordinate values of the respective vertices of the virtual regular tetrahedron and a corresponding one of the calculated coordinate values of the respective vertices of the measured regular tetrahedron is defined as Expression 1, $$\begin{bmatrix} x_{1,m} - x_1 \\ y_{1,m} - y_1 \\ z_{1,m} - z_1 \\ \vdots \\ x_{4,m} - x_4 \\ y_{4,m} - y_4 \\ z_{4,m} - z_4 \end{bmatrix} = \begin{bmatrix} -x_1 & 0 & 0 & y_1 & 0 & z_1 \\ 0 & -y_1 & 0 & 0 & -z_1 & 0 \\ 0 & 0 & z_1 & 0 & 0 & 0 \\ \vdots & \vdots & \vdots & \vdots & \vdots & \vdots \\ -x_4 & 0 & 0 & y_4 & 0 & z_4 \\ 0 & -y_4 & 0 & 0 & -z_4 & 0 \\ 0 & 0 & z_4 & 0 & 0 & 0 \end{bmatrix} \begin{bmatrix} c_x \\ c_y \\ c_z \\ s_{zx} \\ s_{xz} \\ s_{yz} \end{bmatrix}$$ [Expression 1]

where $c_i$: scale error (i=X, Y, Z),
$s_{ij}$: squareness error (i, j→=X, Y, Z),
$x_i$: an x coordinate of a vertex of a virtual regular tetrahedron (i=1, 2, 3, 4),
$x_i$: a y coordinate of a vertex of the virtual regular tetrahedron (i=1, 2, 3, 4),
$z_i$: a z coordinate of a vertex of the virtual regular tetrahedron (i=1, 2, 3, 4),
$x_{i,m}$: an x coordinate of a vertex of a measured regular tetrahedron (i=1, 2, 3, 4),
$y_{i,m}$: a y coordinate of a vertex of the measured regular tetrahedron (i=1, 2, 3, 4), and
$z_{i,m}$: a z coordinate of a vertex of the measured regular tetrahedron (i=1, 2, 3, 4).

10. The non-transitory computer-readable recording medium of claim 6, wherein the position indicator is a tool ball or a three-point support socket.

* * * * *